United States Patent [19]
Davis

[11] Patent Number: 4,802,231
[45] Date of Patent: Jan. 31, 1989

[54] PATTERN RECOGNITION ERROR REDUCTION SYSTEM

[76] Inventor: Elliot Davis, 334 Bucyrus Dr., N. Tonawanda, New York, N.Y. 14120

[21] Appl. No.: 124,650

[22] Filed: Nov. 24, 1987

[51] Int. Cl.⁴ .............................................. G06K 9/68
[52] U.S. Cl. ...................................... 382/34; 382/57; 371/26; 364/513.5
[58] Field of Search ...................... 382/34, 57; 381/43; 364/513.5; 371/26

[56] References Cited

U.S. PATENT DOCUMENTS

4,348,550  9/1982  Pirz et al. ............................... 381/43
4,349,700  9/1982  Pirz et al. .......................... 364/513.5
4,713,778  12/1987 Baker ................................. 364/513.5

*Primary Examiner*—Theodore M. Blum
*Attorney, Agent, or Firm*—Pollock, Vande Sande & Priddy

[57] ABSTRACT

A pattern recognition system and method wherein errors are reduced by creating independent error templates which correspond to patterns which tend to be erroneously matched and linked error templates which are linked to specified reference templates which are stored for comparison. Upon comparison with reference templates, independent error templates and linked error templates, the unknown pattern is identified as a match wherever its test template is most closely matched to a reference template, is identified as a non-match when its test template is most closely matched with an independent error template, and when most closely matched to a linked error template, the comparison criteria are revised and further comparison(s) are made.

12 Claims, 1 Drawing Sheet

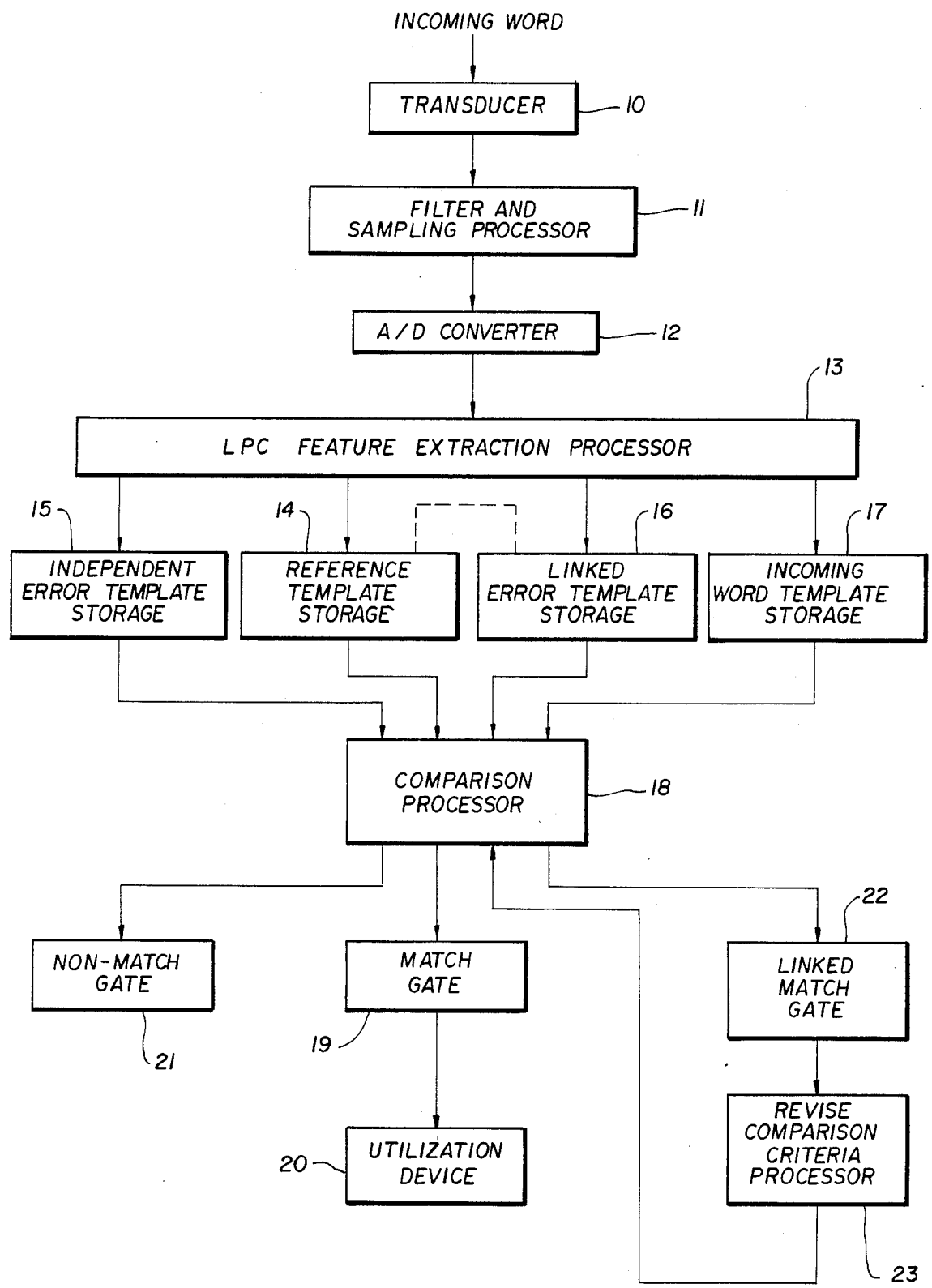

PATTERN RECOGNITION ERROR REDUCTION SYSTEM

This invention relates to automatic pattern recognition systems, such as speech recognition, and more particularly to a method and apparatus for reduction of errors in such systems.

In many known speech recognition systems an input speech pattern is analyzed to provide a set of features characteristic thereof. Such feature signals may be derived through a spectral, linear prediction, or other analysis of successive time intervals of the speech pattern. Initially, the recognition apparatus is trained by generating feature signal templates for utterances of identified reference patterns. Subsequent to the storage of the reference pattern feature signal templates, an unknown utterance is analyzed and the sequence of feature signals for the unknown utterance is compared to the template sequence of the reference patterns. After the comparisons are completed, the unknown utterance is identified as the reference pattern whose feature signals most closely correspond to the feature signals of the unknown utterance.

The amplitude spectrum of speech is estimated by linear predictive coding (LPC), also known as autoregressive analysis. LPC predicts the amplitude of a speech waveform at any instant by combining the amplitudes at a number of earlier instants. The LPC coefficients that best approximate the speech waveform can be mathematically converted to approximate the amplitude spectrum. In speech applications, the LPC analyzer is basically a lattice of filters that approximate a series of resonant cavities, thus simulating the vocal tract.

A comparison of the feature sequence of an incoming word to the feature sequence of a reference template requires time alignment of the feature sequences to account for differences in speech rate and articulation, and measurement of the similarity of corresponding features. Time alignment optimization is generally accomplished in the art by dynamic programming to determine the length of an incoming word's feature sequence as compared to a reference template's feature sequence.

The successful use of voice signals requires that utterances be recognized as particular words or phrases. Accurate recognition, however, is difficult because of the complexity of speech patterns and their variability from speaker to speaker and even for the same speaker from time to time.

A common approach to improving pattern recognition and reducing errors in speech recognition systems is to refine the features characteristic of the words desired to be recognized so as to better distinguish these words from closely related words. This is a complex and laborious process since it requires a detailed knowledge of the template-making process.

It is, therefore, a primary object of this invention to reduce errors in pattern recognition systems such as speech and the like.

An additional object of this invention is to reduce errors in pattern recognition systems without requiring detailed knowledge of the template-making process.

Another object of this invention is to render speech recognition systems more speaker and pronunciation independent.

An additional object of this invention is to reduce errors stemming from internal positive substitution.

Yet another object of this invention is to reduce errors stemming from external positive substitution.

Still another object of the invention is to reduce errors in speech identification and verification systems.

These and other objects of this invention will be better appreciated by referring to the following description and drawing.

BRIEF DESCRIPTION OF THE INVENTION

Briefly, this invention pertains to a method and apparatus for reducing errors in automated pattern recognition systems. Error templates are created which correspond to erroneous words or sets of words such that incoming test words are compared against the error templates and against reference templates. If the closest match is to an error template, the word is discarded as a non-match, whereas if the closest match is to a reference template, the word is identified as a correct match. Linked error templates are also created such that if the closest match is to a linked error template, the error template and its linked word are both discarded from further consideration of finding the best match.

DESCRIPTION OF THE DRAWING

The FIGURE illustrates a block diagram of the apparatus of the invention.

DETAILED DESCRIPTION OF THE INVENTION

In any speech recognition system there is usually a finite probability of error in matching an incoming speech pattern with a reference pattern. Speech patterns can be words, sounds or their components such as phonemes and allophones.

When comparing an incoming word with a reference word in the system's vocabulary, there are basically three types of error which may occur:

(1) External Positive Substitution - an incoming word which is external to the system's vocabulary erroneously matches to a vocabulary word.

(2) Internal Positive Substitution - an incoming word which is internal to the system's vocabulary matches the wrong vocabulary word.

(3) Non-recognition - an incoming word which is internal to the system's vocabulary does not match any vocabulary word.

This invention addresses itself to the first two types of errors.

In a speech recognition system which is designed to recognize a finite number of words through the mechanism of template matching, the error rate can be dramatically reduced by introducing one or more "Error Templates" which correspond to speech patterns that are not within the system vocabulary. Consider, for example, a system having a one-word reference vocabulary. If another word, randomly chosen, is introduced as an error template, then each word would have an equal chance of being matched to a third, randomly chosen, incoming word. As more randomly chosen error templates are introduced into the system, the probability (P) that an incoming word will match the reference word decreases proportionally as $$P = \frac{1}{1 + N_{ET}}$$

where $N_{ET}$ is the number of error templates.

Once those words which are potentially a source of error are identified, their patterns can be intentionally introduced into the system as error templates to shunt incoming words which would otherwise be mismatched.

Since language words fall into a finite number of sets, the error templates should be chosen from as great a variety of these sets as possible. The number of error templates may be reduced by combining them together in such a way as to retain in the composite a significant amount of the unique features of the individuals. For example, the weighted average $$ET(N) = \frac{N_{ET} + \sum_{n=2}^{N} 2^{n-2} ET_n}{2^{N-1}}$$

defines the optimum number of error templates ET(N).

Referring to the FIGURE, templates corresponding to appropriate utterances are first stored in reference template storage 14, independent error template storage 15, and linked error template storage 16. Templates corresponding to incoming utterances to be tested are temporarily stored in incoming word template storage 17 and are then compared with the previously stored templates in storage means 14, 15, and 16 in comparison processor 18.

Describing this process in greater detail, an incoming utterance or word is received by transducer 10 and converted to an electrical signal. The signal is applied to filter and sampling processor 11 which removes noise and undesired frequencies and samples the filtered signal at a predetermined rate in a manner well known in the art. The signal is then applied to an analog-to-digital converter 12 to create a digitally coded representation of the signal which is then applied to the LPC feature extraction processor 13.

Feature extraction processor 13 is adapted to produce a time frame sequence of acoustic feature signals characteristic of the unknown speech pattern. The time frames may, for example, be 5-50 msec in duration. For each time frame, a set of linear predictive parameters are obtained which characterize the frame speech spectrum. The predictive feature signals may then be linearly scaled to a prescribed number of time frames. Processor 13 may comprise a microcomputer arrangement such as one using the Motorola type 6800 microprocessor which is described in U.S. Pat. No. 4,519,094, which is incorporated herein by reference. Another arrangement which may be used utilizes the General Instrument SP1000 voice recognition chip, is denoted as the "Lis'ner 1000", and is described in an article entitled "The Lis'ner 1000" by Steve Ciarcia, Byte, November, 1984, Pp. 111-124, which is also incorporated herein by reference.

In the storing of templates, the output of LPC processor 13 constitutes a variety of templates which are stored in reference template storage 14, independent error template storage 15, or linked error template storage 16. As mentioned, these templates are compared in comparison processor 18 against templates from incoming word template storage 17.

Comparison processor 18 is adapted to determine the degree of correspondence between the acoustic feature signals of the unknown speech pattern and the feature signals of each reference template. Processing is done in accordance with the principles of dynamic time warping generally described in the article "Considerations in Dynamic Time Warping Algorithms For Discrete Word Recognition" by L. R. Rabiner, A. E. Rosenberg and S. E. Levinson, IEEE Transactions On Acoustics, Speech and Signal Processing, Vol. 26(6) pages 575-582, December 1978, to take into account variations in speech rate and articulation.

Incoming word templates are placed in temporary storage 17 while they are compared in comparison processor 18 to templates permanently stored in reference templates 14, independent error templates 15, and linked error templates 16 to identify the closest match.

Reference template 14 stores templates of those vocabulary words which the system is intended to recognize. Independent error template 15 stores words or composites which the system is intended not to recognize. Finally, linked error template 16 stores words or composites which have similar sounds to words which the system is intended to recognize.

Comparison processor 18 outputs to a matched reference template gate 19 which activates a utilization device 20 whenever an incoming word template 17 is best matched to a word stored as a reference template 14, thus declaring that the incoming word has been recognized as a vocabulary word. Whenever comparison processor 18 determines that an incoming word template 17 is best matched to a word or composite stored as an independent error template 15, the output is to a non-match gate 21 which terminates further processing of that incoming word. Thus, whenever the closest match is to an independent error template, the system does not declare a match.

Finally, whenever comparison processor 18 determines that an incoming word template 17 is best matched to a word or composite stored as a linked error template 16, the output is to linked match gate 22 which activates processor 23 for revising the comparison criteria in comparison processor 18. Revision in comparison processor 18 initially requires that the next best match be sought, provided that all independent error templates are discarded and that the linked reference template also be discarded. Thus, the next best match may be a reference template, in which case match gate 19 would activate utilization device 20. On the other hand, the next best match may be another linked error template, in which case linked match gate 22 would activate yet another revision in comparison processor 18. A limit may be placed on the number of permissible revisions, in which case a non match would also result.

In designing a speech recognition system which utilizes error templates in accordance with this invention, it is first necessary to ascertain whether the primary source of errors arise from external positive substitution or internal positive substitution. Although both sources of error can be reduced by the use of error templates in accordance with this invention, the procedures differ depending upon the source of error.

Where the primary source of error is from external positive substitution, significant error reduction can be achieved by incorporating error templates which correspond to the error sources. Consider, for example, a speech recognition system having a one-word vocabulary, say the word "blow." The template for the word "blow" would be stored in reference template storage 14. Now assume that the incoming word "snow" is erroneously processed by the system as a match. The prior art approach would be to refine the template for the word "blow" so as to better distinguish it from the word "snow" thereby avoiding the error next time. The present invention, however, would simply add the word "snow" to the vocabulary by creating a template for this word and storing it as an independent error template 15. The next time the incoming word is "snow" its incoming word template 17 will be best matched to the independent error template "snow" (which is stored in 15) and discarded by way of non-match gate 21.

In order to reduce the required number of error templates, one can construct composite error templates which retain the drawing ability of their constituent parts. It has been found empirically that composite error templates may be created by averaging together words tending to cause the errors, thus creating the composite templates.

In other words, in order to generate error templates to protect reference templates from the largest variety of non-matching words, it is desirable to have error templates which deviate from the reference template in a given direction and by a given distance in generalized template space. Since such a template may not correspond to a known, or even utterable word, it poses some problem as to how such a template may be formulated. It has been found empirically, however, that such templates may be formed by averaging or combining together words that are potential sources of error thus making a composite template.

Thus, instead of creating an error template to correspond directly to the word "snow" one can create a composite error template, such as the fictitious word "shmow" and store it as an independent error template 15. In this case, a whole set of incoming word templates 17 such as "snow, slow, sew, so, shown, stow" etc. would be best matched to the composite error template in storage 15, shunted to non-match gate 21, and, therefore, not falsely recognized as the internal vocabulary word "blow."

It is significant that no knowledge of the template formation process is necessary in order to use the principles of this invention. All that is needed is the ability to create additional templates, and designate them as error templates.

Now for the problem of internal positive substitution. Assume that there are two vocabulary words, "slow" and "snow" stored as reference templates 14, and that when the incoming word "slow" is mispronounced as "shlow" its template 17 tends to be erroneously matched to the word "snow" stored in template 14. This mis-match can be corrected by creating a composite error template, say the word "shmow", placing it in linked error template storage 16, and linking it to the internal word "snow". Now, when the incoming word is mispronounced as "shlow" it will likely be matched to the linked error template "shmow" in storage 16. Since error template "shmow" in storage 16 is linked to internal vocabulary word "snow" in storage 14, both the error template and its linked word are removed from further consideration as a possible match. This leaves the word "slow", also in storage 14, as the next best match, thereby activating gate 19 and utilization device 20.

In seeking to distinguish a particular pattern from alternate patterns or randomly generated noise, some measure of "distance" or deviation of the test data from a standard representation of the pattern sought must be defined. In many established pattern recognition procedures, the distance measure is defined only in relation to the standard template and the test pattern. This invention differs in making use of prior knowledge concerning the probable occurrence of data samples which are similar to the one standard under consideration, while actually belonging to the domain of a different standard template. Thus the invention assumes, at least implicitly, the existence of multiple standard templates, even though the object of a particular implementation may be the identification of a "match" to only one.

To be somewhat more specific, one can view the standard templates (designated by A, B, . . . ) and a sample to be analyzed (designated by S, T, . . . ) as functional values within a defined domain. In speech, for example, such function could be the amplitude in a two dimensional time-Fourier space. In a visual image one might consider simply the intensity distribution in a two-dimensional image plane. A simple distance measure could then be the integral $$\phi = \sim [S(X,Y) - A(X,Y)]^2 \, dxdy$$

or in the case of a system based upon discrete sampling, the corresponding summation $$\phi = \sum_i (S_i - A_i)^2$$

in which $\phi$ is the distance function or a measure of mismatch. Identification of the test pattern as "A" would then require $\phi$ to be less than some prescribed tolerance limit.

A more refined approach would incorporate the possibility that not all regions of the domain over which these functions are defined are equally important as discriminants. That is, that an acceptable match to some standard template can tolerate much larger deviations in one region than in another. This property is incorporated through a weighting function "W" in the distance measure computation $$\phi = \sum_i W_i (S_i - A_i)^2$$

This invention embodies the additional concept that a test pattern being examined for a match to "A" is more likely to be similar to "B" or "C" than to be a completely random function. Stated alternatively, for an acceptable match to "A" the distance function must be much smaller if the deviation is toward known detractors "B" or "C" than would be the case for a random deviation from the standard "A". This approach could be implemented by the multi-condition match criterion: the sample belongs to "A" if the distance from "A" is sufficiently small, AND the distance to "A" is less than the distances to "B", "C" or any other template within the comparison set.

This procedure, or one nearly equivalent to it, can be visualized in terms of correlations within the pattern of deviation of test data from standard template "A". As a specific example, define the function $$\Delta B_i = B_i - A_i$$

simply the linear difference between standards "A" and "B". Notice that it is not the same as the distance function between the two. A new error measure can then the expressed in form of the deviation, and a term based upon the congruence of the deviation within the A-B difference. In a fully developed procedure, this generalized distance would include correlation terms with the difference function for all competing templates.

$$\phi = \sum_i (S_i - A_i)^2 + K \sum_i \Delta B_i(S_i - A_i) + \ldots$$

The first term in this equation is simply the distance function described above. It is modified, however, by the additional term whose value is related to whether or not the deviation of test template S from the reference A is toward alternative reference B or not. Deviation toward B is thus interpreted as a less-close match to A, than if the deviation had been in a random direction. Such correlations with multiple templates can be accommodated by including corresponding terms of this form in the distance measure calculation. K is simply a weighting factor to scale the strength of the correlation terms.

Another example of how the invention can be used is to reduce positive substitution error in both speaker identification and speaker verification systems.

Sounds from many different individuals are recorded as templates while the association of a sound with the individual who uttered it is retained.

The templates are then divided into two populations. The templates from those people who require identification are entered as reference templates in block 14. The templates from those people who do not require identification are entered as independent error templates in block 15. For the purpose of speaker identification block 14 may contain many reference templates per test utterance while for speaker verification block 14 may contain only one reference template per test utterance.

If in response to a test utterance, comparison processor 18 outputs a best match to a reference template from 14, then the persons name or identification code associated with that template is outputted through matched gate 19 and a utilization device 20 activated. If, however, the best match is to an independent error template from 15 then a non-identification is outputted through non-match gate 21.

There thus has been described a novel pattern recognition system. While the description has been with reference to speech and voice recognition systems, it will be apparent that the principles of this invention may be applied to visual and other pattern recognition systems in which matching techniques are employed. Other changes and modifications may also become apparent to persons skilled in the art without departing from the spirit and scope of this invention as defined by the appended claims.

I claim:

1. A device for reducing errors in automated pattern recognition systems comprising:
   (a) means for creating reference templates which correspond to known patterns;
   (b) means for creating test templates which correspond to unknown patterns;
   (c) means for creating independent error templates which correspond to erroneously matched patterns;
   (d) comparison means for comparing test templates to reference templates and to independent error templates;
   (e) means for identifying the unknown pattern as a match whenever its test template is most closely matched to a reference template; and
   (f) means for discarding the unknown pattern as a non-match whenever its test template is most closely matched to an independent error template.

2. The device of claim 1 further comprising means for creating linked error templates which are linked to specified reference templates, and wherein said comparison means compares test templates to said linked error templates in addition to said reference templates and independent error templates.

3. The device of claim 2 wherein said independent error templates and said linked error templates are composite templates which correspond to a class of erroneously matched patterns.

4. The device of claim 3 further comprising means for modifying said comparison means whenever said test template is most closely matched to a linked error template, said modification being to discard from further consideration said linked error template, its specified reference template, and all independent error templates.

5. The device of claim 4 further comprising means for comparing said test template to the next best match among reference templates and remaining linked error templates.

6. A device for reducing errors in automated pattern recognition systems comprising:
   (a) means for creating reference templates which correspond to known patterns;
   (b) means for creating test templates which correspond to unknown patterns;
   (c) means for creating linked error templates which are linked to specified reference templates;
   (d) comparison means for comparing test templates to reference templates and to linked error templates;
   (e) means for identifying the unknown pattern as a match whenever its test template is most closely matched to a reference template; and
   (f) means for modifying said comparison means whenever said test template is most closely matched to a linked error template, said modification being to discard from further consideration said linked error template, and its specified reference template.

7. The device of claim 6 further comprising means for comparing said test template to the next best match among reference templates and remaining linked error templates.

8. In an automated pattern recognition system in which the characteristics of known patterns are stored as a series of reference templates to be compared against the characteristics of incoming unknown pattern templates, a method of reducing matching errors comprising the steps of:
   (a) determining those incoming pattern templates which tend to be erroneously matched to reference templates;
   (b) creating independent error templates which correspond to the incoming pattern templates which tend to be erroneously matched;

(c) comparing incoming pattern templates against the said reference templates and the said independent error templates;
(d) identifying the unknown pattern as a match whenever its template is most closely matched to a reference template; and
(e) discarding the unknown pattern as a non-match whenever its template is most closely matched to an independent error template.

9. The method of claim 8 further comprising the step of creating linked error templates which are linked to specified reference templates.

10. The method of claim 9 wherein said independent error templates and said linked error templates are composite templates which correspond to a class of erroneously matched patterns.

11. The method of claim 10 further comprising the step of discarding from further consideration the linked error template, its specified reference template, and all independent error templates whenever the unknown pattern template is most closely matched to a linked error template.

12. The method of claim 11 further comprising the step of comparing the unknown pattern template to the next best match among the reference templates and the remaining linked error templates.

* * * * *